United States Patent Office 3,597,469
Patented Aug. 3, 1971

3,597,469
CYCLOALKYL UNSATURATED ESTERS
William A. Bradwell, Rensselaer, N.Y., assignor to
GAF Corporation, New York, N.Y.
No Drawing. Filed July 29, 1968, Ser. No. 754,525
Int. Cl. C07c 61/16, 69/74
U.S. Cl. 260—468P          3 Claims

ABSTRACT OF THE DISCLOSURE

Novel cycloalkyl unsaturated esters, alcohols and aldehydes useful as agricultural chemicals and as intermediates in the production of other useful materials comprising compounds of the formula:

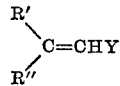

wherein R' is a cycloalkyl radical; R" is selected from lower alkyl, phenyl, and cycloalkyl radicals; and Y is selected from the group of $CH_2OH$, CHO and COOR''' wherein R''' is selected from hydrogen and alkyl.

Novel intermediates produced during the preparation of such compounds comprise compounds of the formula:

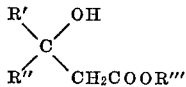

wherein R', R" and R''' are as designated above.

---

The present invention relates to novel organic compounds having a utility as agricultural chemicals and as intermediates in the production of other useful materials; more particularly, the present invention is directed to certain novel cycloalkyl substituted unsaturated acids, ester, alcohols, and aldehydes, and cycloalkyl, hydroxy-substituted saturated esters formed as intermediates in the production of the aforementioned novel compounds.

In accordance with the present invention, certain new organic compounds have been developed which possess utility as agricultural chemicals and as compounds useful as intermediates for the preparation of other useful chemical compounds. Thus, the compounds of the present invention have been found to be useful, for example, in pre-emergence weed control and plant growth retardation. Thus, in accordance with the present invention, the novel compounds include compounds corresponding to the following general formula:

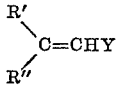

wherein R' is a cycloalkyl radical, e.g. a cycloalkyl radical from about 3 to about 8 carbon atoms; R" is a lower alkyl radical, phenyl radical, or cycloalkyl radical; and Y is selected from COOR''', $CH_2OH$, and CHO, wherein R''' is selected from hydrogen and alkyl radicals.

Accordingly, it is a principal object of the present invention to provide certain novel cycloalkyl-substituted compounds having a utility as intermediates in the production of other useful chemical compounds, and as agricultural chemicals.

A further object of the present invention relates to certain novel cycloalkyl substituted unsaturated esters, alcohols, and aldehydes characterized by an ability to act as pre-emergence weed controlling agents and plant growth retardants.

A still further object of the present invention comprises certain novel cycloalkyl-substituted, hydroxy-substituted, saturated carboxylic acid esters useful as intermediates in the production of the other novel compounds of the present invention.

Still further objects and advantages of the novel compounds of the present invention will become more apparent from the following more detailed description thereof.

In the above general formula, suitable cycloalkyl radicals for R' and R" include, for example:

| cyclopropyl | cyclopentyl |
| cyclobutyl | cyclohexyl, etc. |

Similarly, suitable lower alkyl radicals represented by R" include, for example:

| methyl | t-butyl |
| ethyl | n-amyl |
| n-propyl | neopentyl |
| isopropyl | n-hexyl |
| n-butyl | octadecyl, etc. |
| isobutyl | |

In a like manner, suitable alkyl radicals representing R''' in the moiety COOR''' can comprise alkyl radicals of from about 1 to about 18 carbon atoms. These include the lower alkyl radicals represented above, as well as higher alkyl radicals such as:

| n-heptyl | dodecyl |
| n-octyl | tridecyl |
| oxo-octyl | tetradecyl |
| n-nonyl | pentadecyl |
| oxo-nonyl | hexadecyl |
| decyl | heptadecyl |
| undecyl | octadecyl, etc. |

The novel compounds of the present invention are prepared generally by the reaction of the cycloalkyl substituted ketone with an alkyl haloacetate. More specifically, the novel compounds of the present invention are prepared by the reaction of a ketone of the formula:

wherein R' and R" have the same significance as described above with an approximately equivalent amount, up to an excess of about 25 mol percent, of an alkyl haloacetate. The reaction may be carried out in a suitable solvent, such as benzene, toluene, xylene, chlorobenzene, ether, acetone, dioxane, and the like, or mixtures of such solvents. A catalytic amount of a condensation catalyst, such as zinc and the like is added. The ketone, alkyl haloacetate and solvent are combined and the catalyst may be added at once, or it may be added after the reaction has been begun by warming. The reaction mixture is heated to the reflux for 1–5 hours, cooled and drowned in acidified water. The solvent layer is separated and the solvent evaporated to produce a product which has the formula:

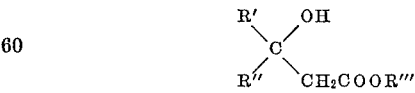

wherein R''' is an alkyl radical from one to about eighteen carbon atoms as defined above.

These intermediate cycloalkyl, hydroxy-substituted saturated esters produced by the reaction of the cycloalkyl-substituted ketone and alkyl haloacetate constitute an embodiment of the present invention, such compounds being useful in the production of the novel compounds of the present invention as indicated below.

The novel compounds of the present invention having the formula indicated above are prepared by dehydration of the above-prepared intermediate compound. Thus, for example, this reaction involving the dehydration of a cycloalkyl, hydroxy-substituted saturated ester can be advantageously carried out in any of the conventional manners for removing water. Thus, for example, it is possible to provide the desired cycloalkyl substituted unsaturated esters of the present invention by dissolving the intermediate compound in a suitable solvent, e.g. pyridine, and treating the same with a dehydrating agent, e.g. phosphorous oxychloride, for up to about 10 hours at temperatures ranging from about 50–100° C. By such a process, the aqueous layer produced is separated and the product obtained is purified by conventional fractionation.

To produce the alcohol derivatives, the esters produced in accordance with the process described above are reduced. Again, this may be done in any conventional manner of reducing the carboxyl group to an alcohol group. For example, such conventional reduction can be accomplished catalytically employing hydrogen gas or by using lithium aluminum hydride, sodium hydride, and similar reducing agents. A suitable process comprises a reduction of the carboxyl group to the corresponding alcohol by treating a solution of the cycloalkyl-substituted unsaturated ester, e.g. a solution in suitable solvent such as ether, with a solution of lithium aluminum hydride in a suitable solvent, e.g. ether, preferably at a temperature below about 10° C. for a period of time of up to 20 hours. The cycloalkyl unsaturated alcohol produced by such a process may be isolated by conventional fractionation.

The aldehyde derivatives of the present invention, i.e. the cycloalkyl-substituted unsaturated aldehydes may be produced by the oxidation of the corresponding alcohol produced by the method described above. Thus, the alcohol product may be prepared by any suitable oxidation process normally employed to oxidize an alcohol to an aldehyde. Thus, for example, a solution of the alcohol product, i.e. a solution in a suitable solvent, e.g. carbon tetrachloride, may be treated at room temperature or a slightly higher temperature with manganese dioxide and similar oxidizing agents to produce the corresponding aldehyde. After oxidation treatment for a period of up to about five hours and subsequent filtration and fractionation, the aldehyde product is produced.

Again, the general process for producing the novel cycloalkyl substituted compounds of the present invention comprises the condensation reaction of a cycloalkyl-substituted ketone and an alkyl haloacetate. Suitable ketones which may be employed in producing the compounds of the present invention are exemplified by:

Cyclopropyl methyl ketone
Cyclopropyl ethyl ketone
Cyclopropyl propyl ketone
Cyclopropyl isopropyl ketone
Cyclopropyl butyl ketone
Cyclopropyl phenyl ketone
Dicyclopropyl ketone
Cyclobutyl methyl ketone
Cyclobutyl ethyl ketone
Cyclobutyl butyl ketone
Cyclobutyl phenyl ketone
Dicyclobutyl ketone
Cyclopentyl methyl ketone
Cyclopentyl ethyl ketone
Cyclopentyl phenyl ketone
Dicyclopentyl ketone
Cyclohexyl methyl ketone
Cyclohexyl ethyl ketone
Cyclohexyl propyl ketone
Cyclohexyl isopropyl ketone
Cyclohexyl butyl ketone
Cyclohexyl phenyl ketone
Dicyclohexyl ketone Similarly, suitable condensation agents, alkyl haloacetates, include the following esters of chloro, bromo, iodo, and fluoroacetic acids:

methyl
ethyl
propyl
isopropyl
butyl
isobutyl
t-butyl
amyl
hexyl
octyl
2,2,4,4-tetramethylbutyl
decyl
dodecyl
hexadecyl
octadecyl The following scheme illustrates the general reactions involved in the production of the novel cycloalkyl-substituted compounds of the present invention:

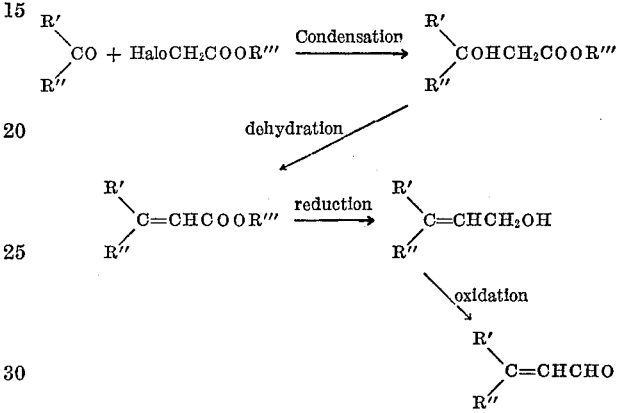

Accordingly, the exemplary cycloalkyl unsaturated acids and esters thereof falling within the scope of the present invention include:

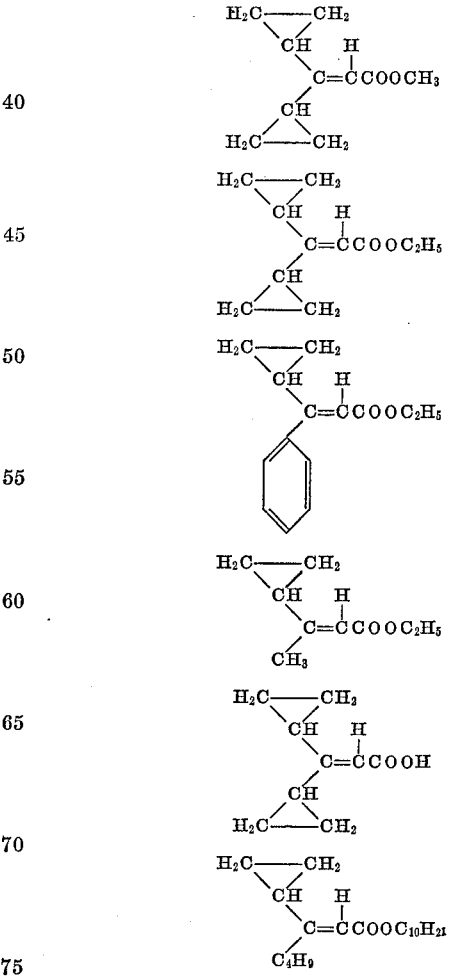

3,597,469
5
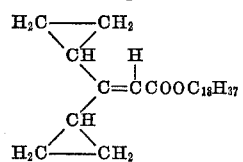
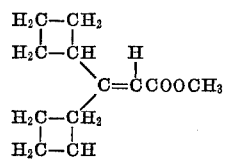
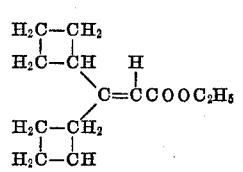
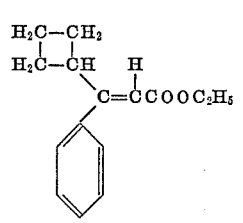
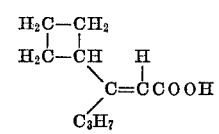
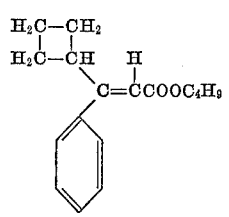
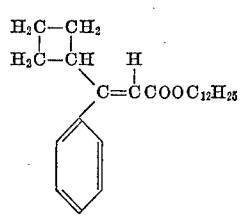
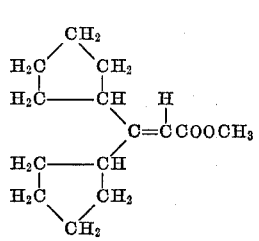
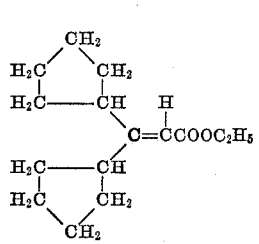
6
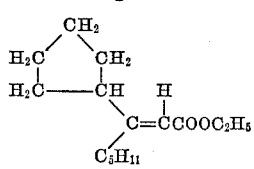
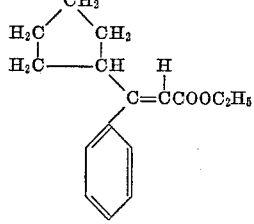
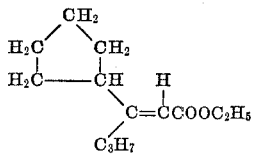
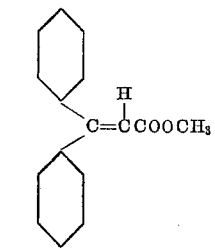
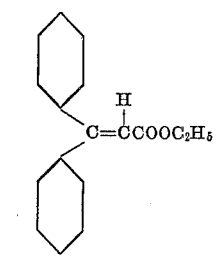
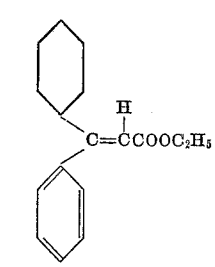
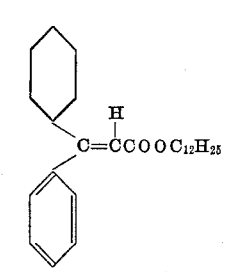

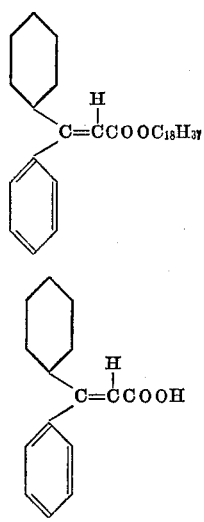
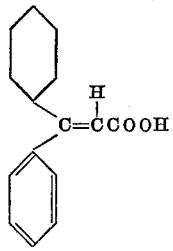
Similarly cycloalkyl substituted unsaturated alcohols falling within the scope of the present invention included:
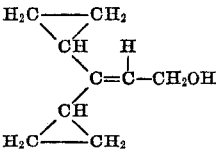
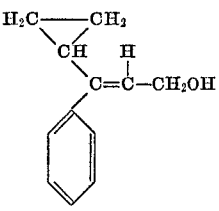
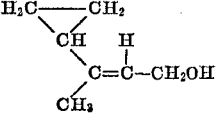
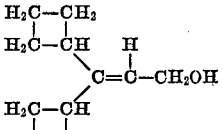
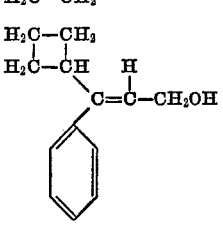
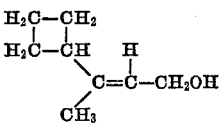
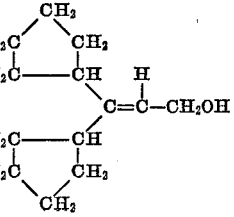
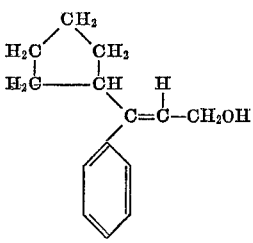
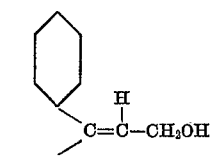
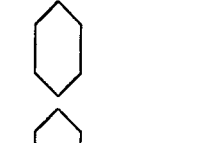
In addition, exemplary cycloalkyl substituted unsaturated aldehydes falling within the scope of the present invention included:
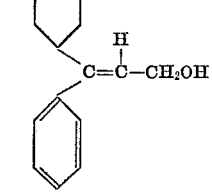
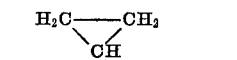
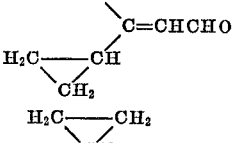
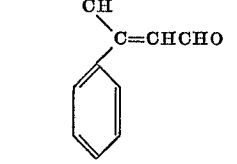
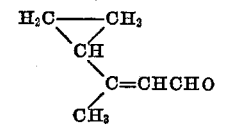
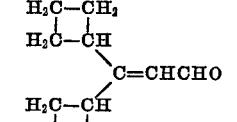
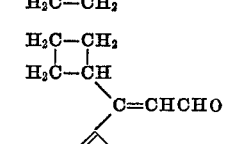
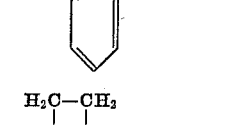
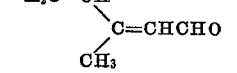

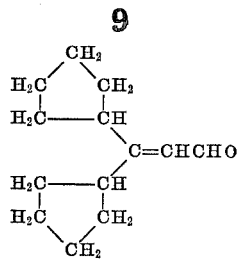
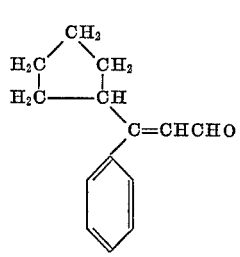
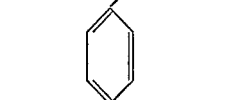
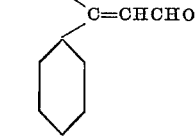
In addition, exemplary novel intermediate compounds, i.e., hydroxy cycloalkyl substituted saturated acids and esters thereof included:
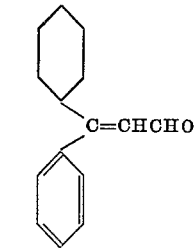
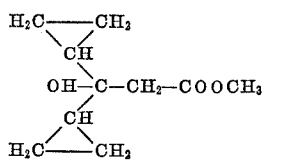
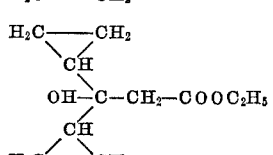
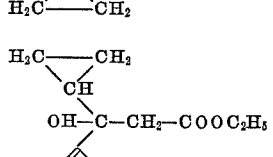
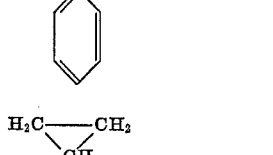
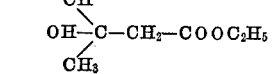
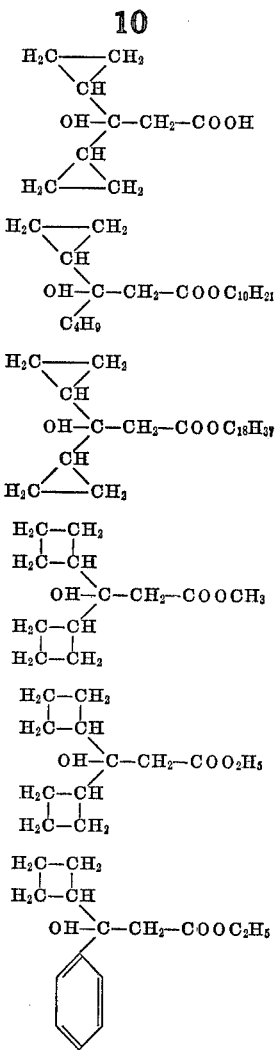
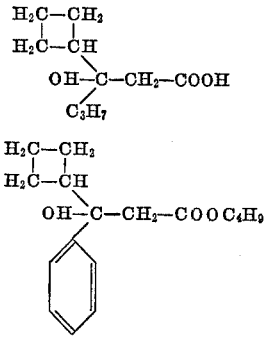
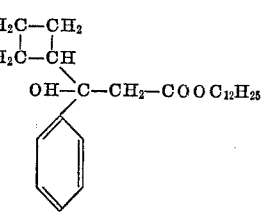
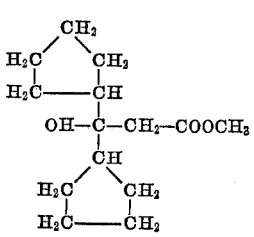

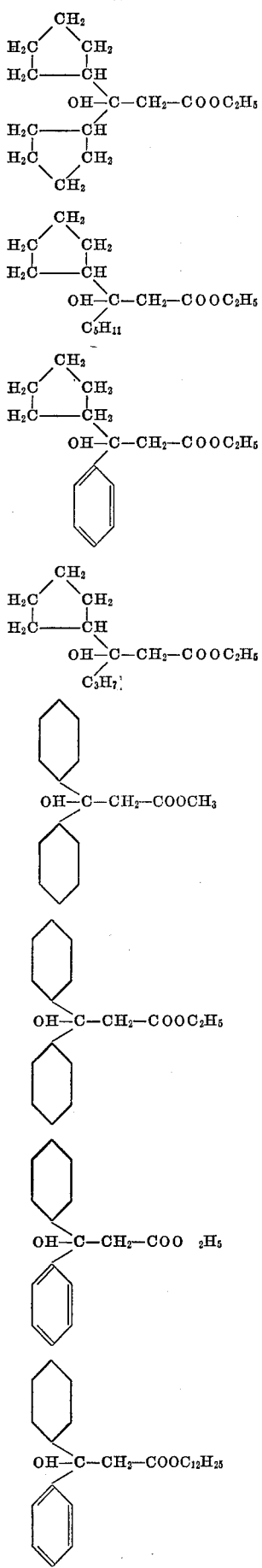

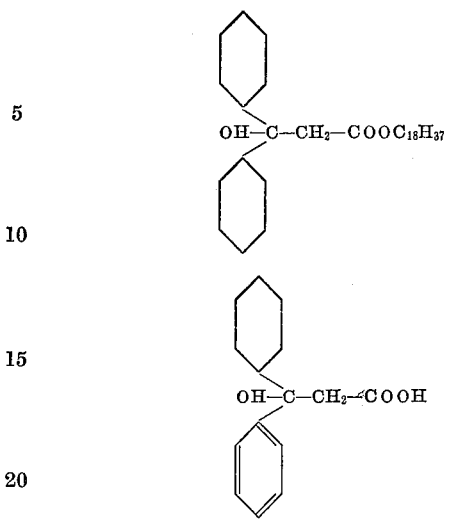

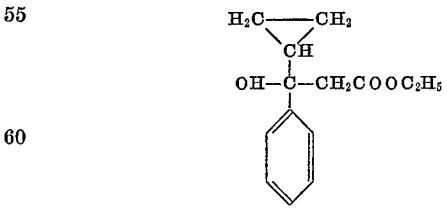

The present invention will now be described by reference to the following specific examples. It is to be understood, however, that such examples are presented for purposes of illustration only, and the present invention is in no way to be deemed as limited thereto.

EXAMPLE 1

Preparation of 3-cyclopropyl-3-hydroxy-3-phenylpropionic acid, ethyl ester

Some 98 g. zinc dust, 50 ml. benzene, 50 ml. ether and 1.0 g. iodine were placed in a 3-neck flask equipped with stirrer, dropping funnel, thermometer and reflux condenser. A solution of 146 g. cyclopropyl phenyl ketone and 200 g. ethyl bromoacetate in 200 ml. benzene and 200 ml. ether were placed in the dropping funnel. A 35 ml. solution was added rapidly to the flask and the flask was gently warmed to initiate the reaction. The remainder of the solution was added drop-wise at a rate to maintain a moderate reflux. An additional 8.0 g. zinc dust was added and the reaction refluxed for 3 hours at 52.5° C. The mixture was cooled and then drowned in 1000 ml. sulfuric acid and stirred for 45 min. The aqueous layer was drawn off and extracted with two 100 ml. portions of benzene.

The organic layer and the benzene portions were combined and successively washed with 5% sulfuric acid solution, 10% sodium carbonate solution and water, and then allowed to stand over magnesium sulfate. After distilling off the solvent, the product was obtained in 87% yield, B.P. 129–130° at 0.8 mm., $n_D^{25}$ 1.5088–1.5090. The product had the structure:

EXAMPLE 2

Preparation of β-cyclopropylcinnamic acid, ethyl ester

Some 234 g. of the product of Example 1 and 1500 ml. pyridine were placed in a 3 l. flask equipped with dropping funnel, stirrer, thermometer and reflux condenser. The flask was cooled to 2° C. and 306.8 g. phosphorous oxychloride was added dropwise while maintaining this temperature. The mixture was stirred for 16 hours allowing the temperature to rise to room temperature and then warmed to and held at 65° C. for 7 hours. The mixture was drowned onto 1500 g. cracked ice with stirring. The aqueous layer was drawn off and extracted with four 300 ml. portions of benzene.

The organic layer and benzene portions were washed successively with 7% hydrochloric acid solution and water. After being allowed to stand over magnesium sulfate, the mixture was filtered and the solvent distilled off. After fractionating, a clear colorless liquid was obtained, B.P. 139–140° C. at 3 mm., $n_D^{25}$ 1.5393, $d_4^{25}$ 1.0461. The product had the structure:

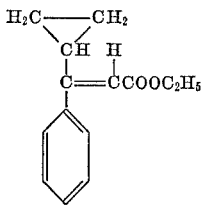

EXAMPLE 3

Preparation of β-cyclopropylcinnamyl alcohol

A solution of 64.8 g. of the product of Example 2 in 150 ml. ether was added dropwise at −10° C. to 22.7 g. lithium aluminum hydride in 1000 ml. ether in a 3-neck flask equipped with stirrer, thermometer, dropping funnel and reflux condenser. After stirring for 2 hours at −10° C. it was warmed to 2° C. and 30 ml. water was cautiously added, then 300 ml. water followed by 1500 ml. sulfuric acid 10%.

The aqueous layer was separated and extracted with two 150 ml. portions of ether. The ether layer and extracts were combined, washed successively with water, potassium carbonate solution 2.5%, and water, and dried over magnesium sulfate. Fractionation yielded a clear, colorless liquid, B.P. 94–95° C. at 0.1 ml., $n_D^{25}$ 1.5581, 65.3% yield. The product had the structure:

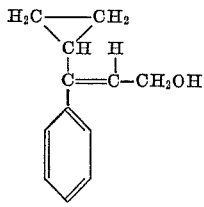

EXAMPLE 4

Preparation of β-cyclopropylcinnamaldehyde 150 g. manganese dioxide was added to a solution of 15 g. of the product of Example 3 in 750 ml. carbon tetrachloride. The mixture was stirred for two hours and filtered. The solvent was distilled off and the residue was fractionated under reduced pressure yielding a light yellow liquid, B.P. 97.5–97.8° C. at 0.3 mm., $n_D^{25}$ 1.5827, $d_4^{25}$ 1.0490, 61% yield. The product had the structure:

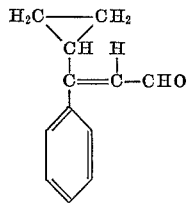

EXAMPLES 5–9

In a manner similar to Example 1 the following ethyl esters were prepared having the formula:

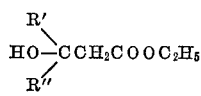

| Ex. | R' | R'' | Yield, percent | B.P. °C. | mm. | $n_D^{25}$ |
|---|---|---|---|---|---|---|
| 5 | C$_6$H$_5$ | Cyclobutyl | 81.8 | 121 | 0.8 | 1.5099 |
| 6 | C$_6$H$_5$ | Cyclopentyl | 86.3 | 146 | 0.3 | 1.5118 |
| 7 | C$_6$H$_5$ | Cyclohexyl | 86.2 | (1) | | |
| 8 | Cyclopropyl | Cyclopropyl | 69.6 | 76 | 0.7 | 1.4587 |
| 9 | CH$_3$ | do | 70 | 53 | 0.6 | 1.4407 |

[1] M.P. 56.4–57.4° C.

EXAMPLES 10–13

In a manner similar to Example 2 the following ethyl esters were prepared having the formula:

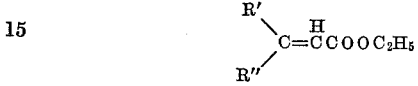

| Ex. | R' | R'' | Yield, percent | $n_D^{25}$ | $d_4^{25}$ |
|---|---|---|---|---|---|
| 10 | C$_6$H$_5$ | Cyclobutyl | 83.5 | 1.5396 | 1.0474 |
| 11 | C$_6$H$_5$ | Cyclopentyl | 81.5 | 1.5320 | 1.0447 |
| 12 | C$_6$H$_5$ | Cyclohexyl | 93.0 | 1.5310 | |
| 13 | Cyclopropyl | Cyclopropyl | 69.0 | 1.5029 | 1.0067 |

In a conventional testing environment, the compound of Example 13 showed good selective pre-emergence weed control, controlling especially wild oats, chickweed and cheat grass.

EXAMPLES 14–15

In a manner similar to Example 3, the following cinnamyl alcohols were prepared having the formula:

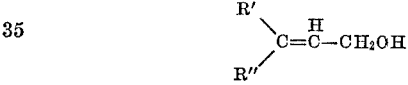

| Example | R' | R'' | UV absorption spectra CH$_3$OH | |
|---|---|---|---|---|
| | | | λ max. | ε×10$^{-3}$ |
| 14 | C$_6$H$_5$ | Cyclohexyl | [1] 225 | [1] 5.6 |
| 15 | C$_6$H$_5$ | Cyclopropyl | 235 | 6.9 |

[1] Absorption maximum estimated from shoulder on curve.

EXAMPLE 16

3-cyclopentyl-3-hydroxy-3-phenylpropionic acid, ethyl ester was dehydrated with phosphorus oxychloride in pyridine in the manner of Example 2 and this was reduced in the manner of Example 3 to produce a product which was identified as 3-phenol-3-cyclopentylidene-1-propanol in 82% yield. Oxidation of this product with manganese dioxide as in Example 4 resulted in 60% yield of β-cyclopentylcinnamaldehyde. The infrared absorption spectrum had a strong band at 1672 cm.$^{-1}$ and a weaker band at 1720 cm.$^{-1}$.

EXAMPLES 17–22

In a similar manner as in Example 1, esters corresponding to the following general formula were prepared by the condensation of the correspondini cycloaliphatic ketones and alkyl haloacetate.

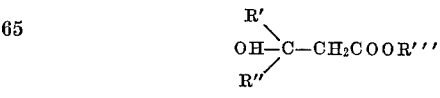

| Example | R' | R'' | R''' |
|---|---|---|---|
| 17 | C$_6$H$_5$ | Cyclobutyl | CH$_3$ |
| 18 | C$_6$H$_5$ | Cyclopentyl | C$_2$H$_5$ |
| 19 | CH$_3$ | Cyclopropyl | C$_2$H$_5$ |
| 20 | C$_3$H$_7$ | Cyclopentyl | C$_2$H$_5$ |
| 21 | C$_6$H$_5$ | Cyclobutyl | C$_{12}$H$_{23}$ |
| 22 | Cyclopropyl | Cyclopropyl | C$_{18}$H$_{37}$ |

EXAMPLES 23-28

In a manner similar to Example 2, the following esters are prepared having the following general formula:

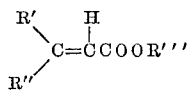

| Example | R' | R'' | R''' |
|---|---|---|---|
| 23 | $C_6H_5$ | Cyclobutyl | $CH_3$ |
| 24 | $C_6H_5$ | Cyclopentyl | $C_2H_5$ |
| 25 | $CH_3$ | Cyclopropyl | $C_2H_5$ |
| 26 | $C_3H_7$ | Cyclopentyl | $C_2H_5$ |
| 27 | $C_6H_5$ | Cyclobutyl | $C_{12}H_{25}$ |
| 28 | Cyclopropyl | Cyclopropyl | $C_{18}H_{37}$ |

As pointed out above, the novel compounds of the present invention, in addition to utility as intermediates in the production of other useful chemical compounds have been found to have utility as agricultural chemicals. Again, it is pointed out that the compounds embraced by the present invention have been found to be useful as agricultural chemicals such as for pre-emergence weed control and plant growth retardation.

While the present invention has been described primarily with respect to the foregoing specific exemplification, it is to be understood that the present invention is in no way to be deemed as limited thereto, but must be construed as broadly as any and all equivalents thereof.

I claim:
1. A compound of the formula:

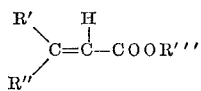

wherein R' is a cycloalkyl group of 3 to 8 carbon atoms; R'' is a cycloalkyl group of 3 to 8 carbon atoms; and R''' is selected from H and an alkyl group of 1-18 carbon atoms.

2. The compound of claim 1 wherein R''' is $C_2H_5$.

3. The compound of claim 2 wherein said compound is β,β-dicyclopropylacrylic acid, ethyl ester.

References Cited

Young et al., Jorg. Chem. 28, 928, 1963.
Julia et al., Bull. Soc. Chim. France, 1964, 3207.
Barltrop et al., J. Chem. Soc. 1956, 2928.
Jorgenson et al., J. Am. Chem. Soc. 90, 3769, 1968.

LEWIS GOTTS, Primary Examiner

R. GERSTL, Assistant Examiner

U.S. Cl. X.R.

71—106, 107, 113, 115, 122, 123; 260—468R, 473A, 476R, 514P, 514R, 515R, 598, 599, 617R, 618R